No. 759,738. PATENTED MAY 10, 1904.
F. McCOWN, A. G. LOUNDAGIN & W. A. WILLIAMS.
PLATFORM ATTACHMENT FOR COMBINED HARVESTERS AND THRESHERS.
APPLICATION FILED SEPT. 15, 1903.
NO MODEL. 5 SHEETS—SHEET 1.
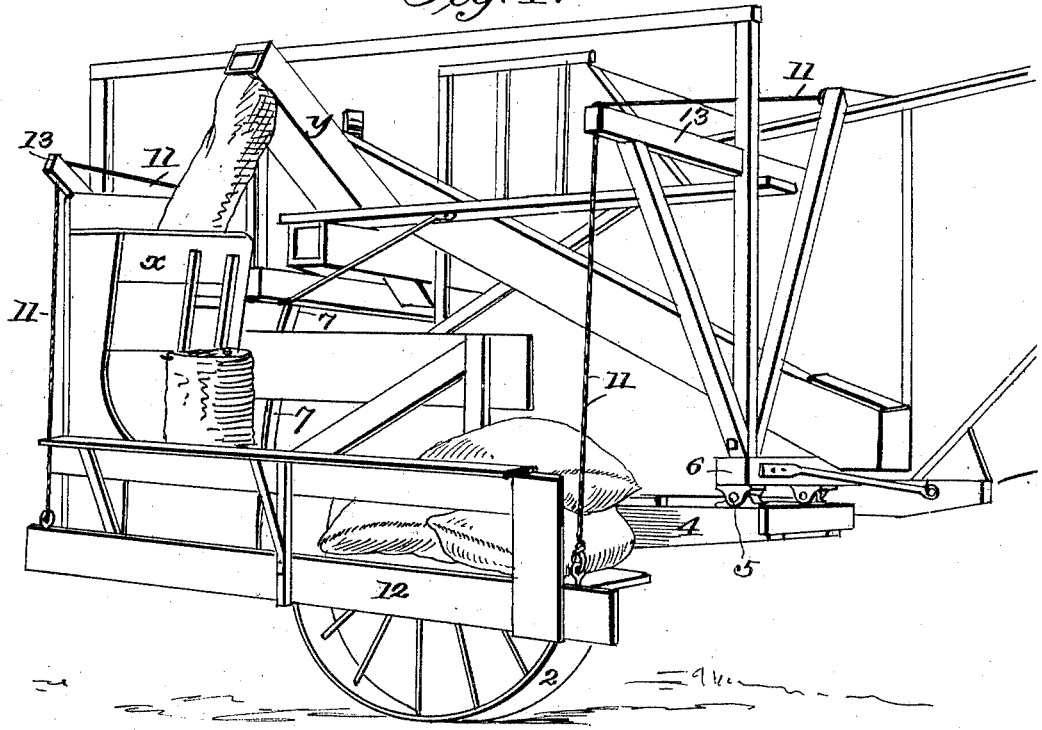
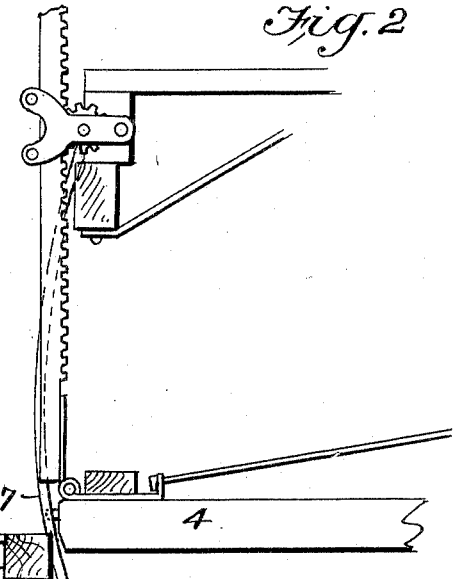
WITNESSES.
Jos. A. Ryan
Amos W. Hart
INVENTORS
F. McCown
A. G. Loundagin
W. A. Williams
BY Munn & Co.
ATTORNEYS

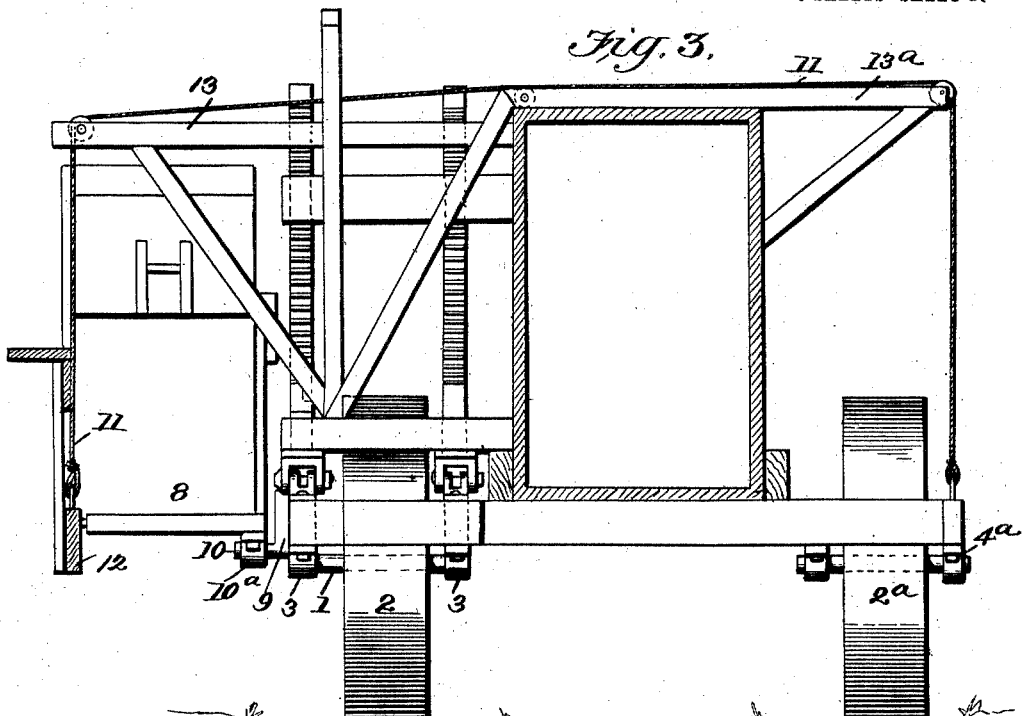

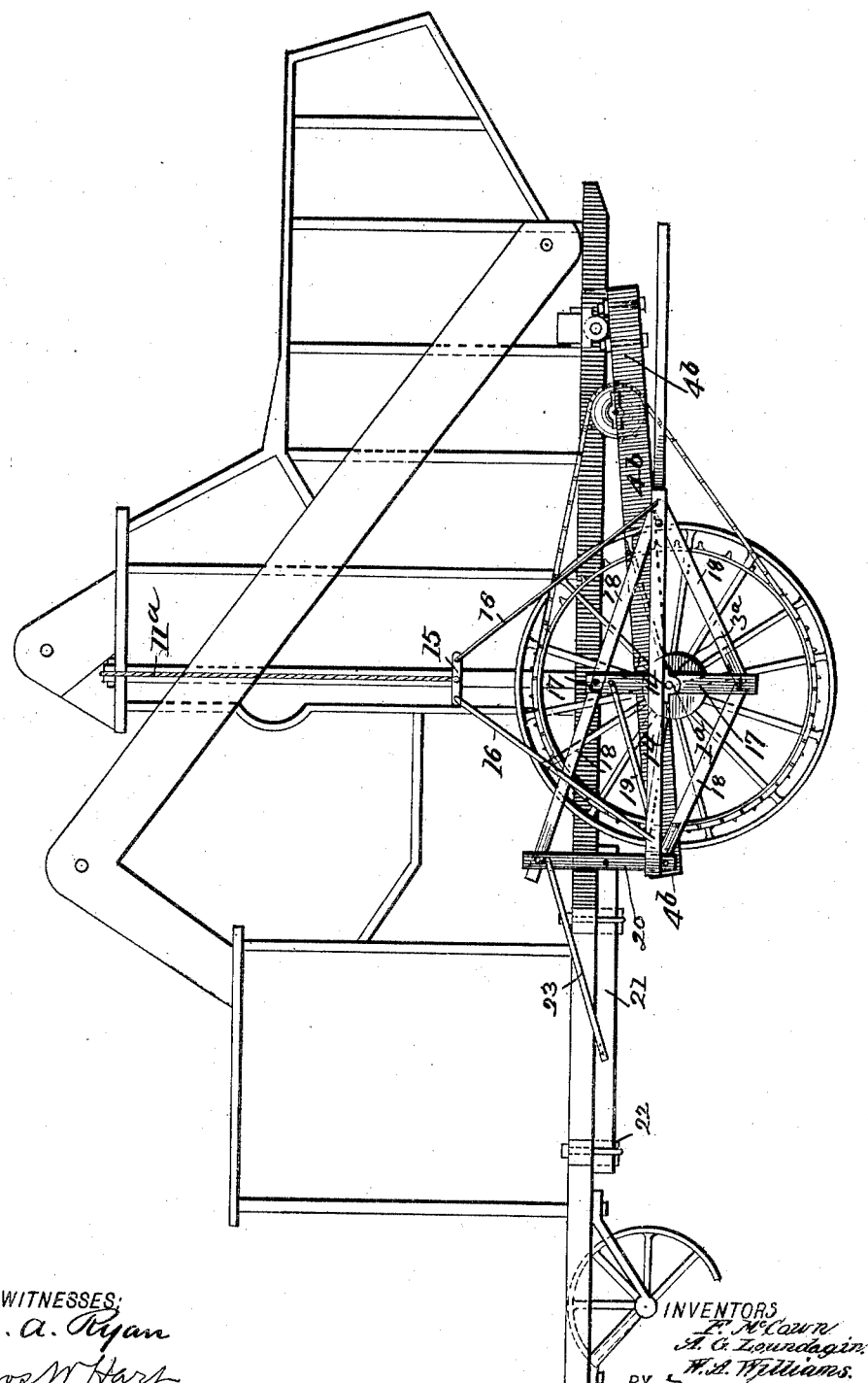

No. 759,738. PATENTED MAY 10, 1904.
F. McCOWN, A. G. LOUNDAGIN & W. A. WILLIAMS.
PLATFORM ATTACHMENT FOR COMBINED HARVESTERS AND THRESHERS.
APPLICATION FILED SEPT. 15, 1903.
NO MODEL. 5 SHEETS—SHEET 4.
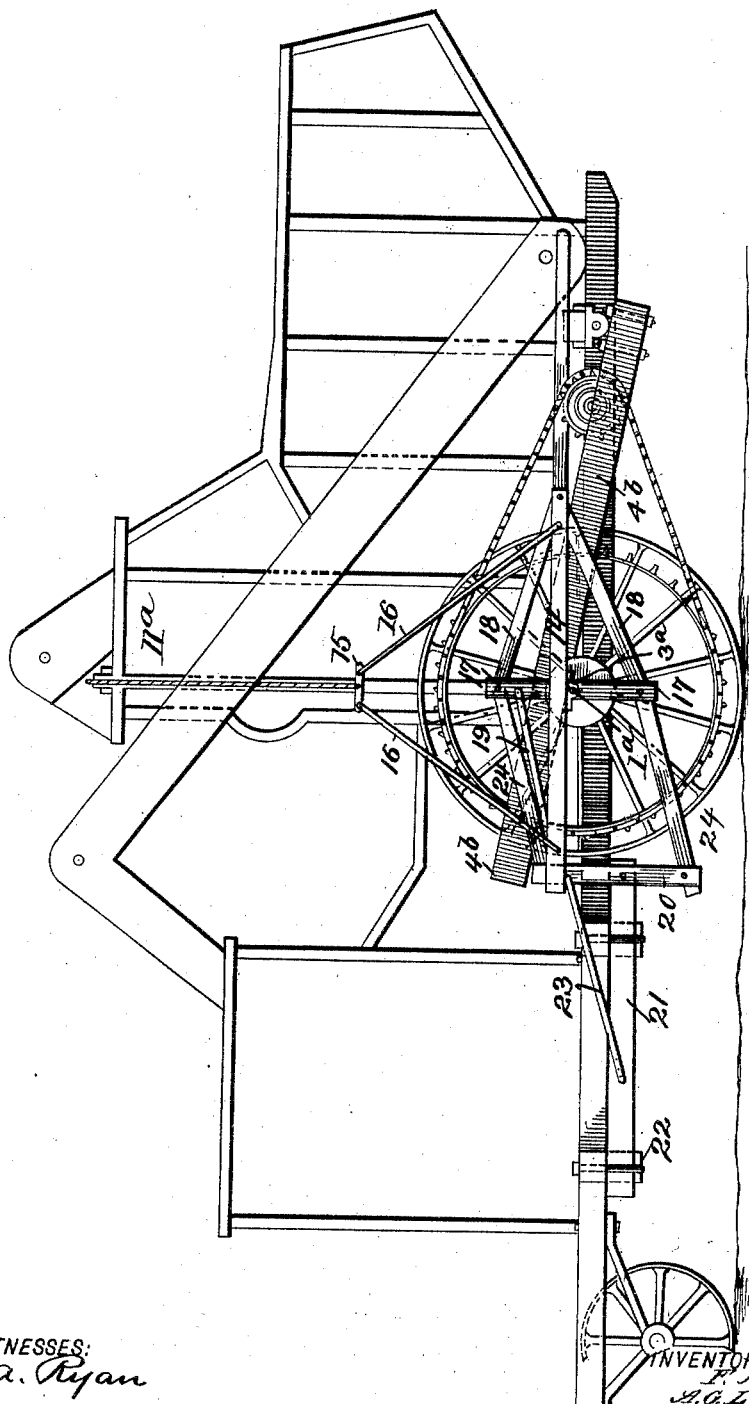

No. 759,738. PATENTED MAY 10, 1904.
F. McCOWN, A. G. LOUNDAGIN & W. A. WILLIAMS.
PLATFORM ATTACHMENT FOR COMBINED HARVESTERS AND THRESHERS.
APPLICATION FILED SEPT. 15, 1903.
NO MODEL. 5 SHEETS—SHEET 5.
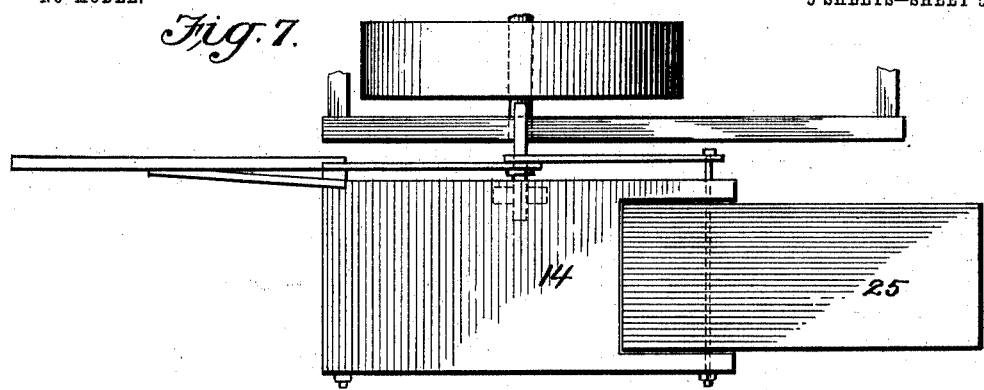
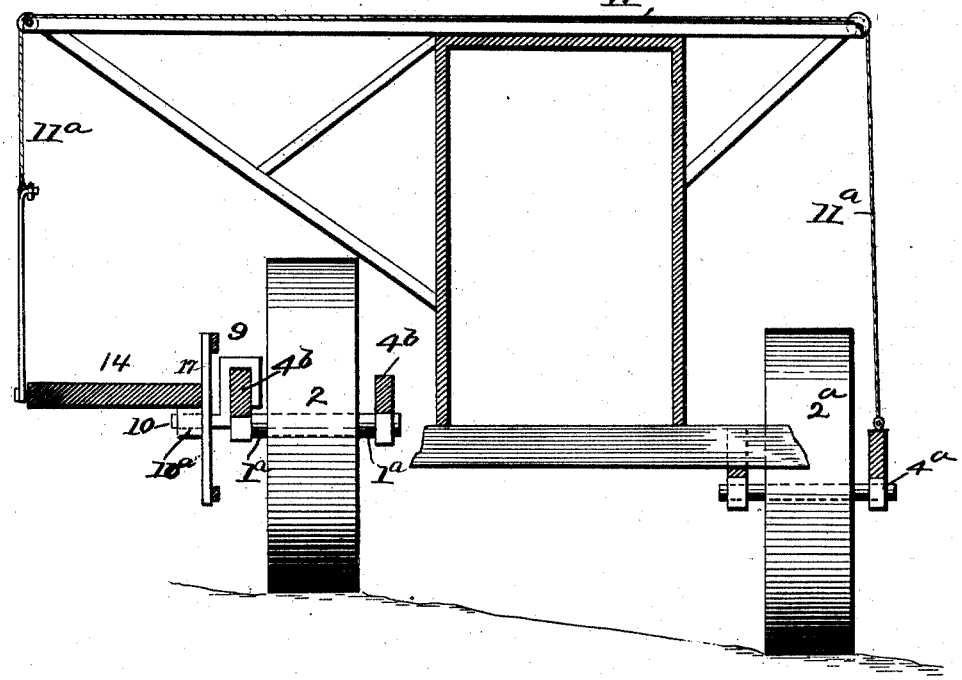
WITNESSES:
Jos. A. Ryan
Amos W Hart
INVENTORS
F. McCown,
A. G. Loundagin,
W. A. Williams.
BY Munn & Co.
ATTORNEYS
THE NORRIS PETERS CO., PHOTO-LITHO., WASHINGTON, D. C.

No. 759,738. Patented May 10, 1904.

UNITED STATES PATENT OFFICE.

FRANK McCOWN, ALVIN G. LOUNDAGIN, AND WILTON A. WILLIAMS, OF WALLA WALLA, WASHINGTON.

PLATFORM ATTACHMENT FOR COMBINED HARVESTERS AND THRESHERS.

SPECIFICATION forming part of Letters Patent No. 759,738, dated May 10, 1904.

Application filed September 15, 1903. Serial No. 173,276. (No model.)

*To all whom it may concern:*

Be it known that we, FRANK McCOWN, ALVIN G. LOUNDAGIN, and WILTON A. WILLIAMS, citizens of the United States, and residents of Walla Walla, in the county of Walla Walla and State of Washington, have invented a new and useful Improved Platform Attachment for a Combined Harvester and Thresher, of which the following is a specification.
Our invention relates to an improvement in that class of combined threshers and harvesters or "combined harvesters," as they are sometimes called, which are provided with a side platform adapted for supporting one or more harvest hands while sacking grain, sewing the filled bags, and delivering the same upon the ground. The details of construction, arrangement, and combination of parts are as hereinafter described, reference being had to accompanying drawings, in which—

Figure 1 is a perspective view of a combined harvester provided with our improved platform attachment. Fig. 2 is a view illustrating means for adjusting the wheeled frame to which our platform is attached. Fig. 3 is a vertical transverse section of a combined harvester with our improved platform attached. Fig. 4 is a side view of a portion of such harvester and the platform. Fig. 5 is a side view of a combined harvester, showing a modified form of our platform. Fig. 6 is a similar view save that the platform and the wheeled frame to which it is secured are shown elevated or in a different position. Fig. 7 is a plan view illustrating the attachment and arrangement of the platform proper which is shown in Figs. 5 and 6. Fig. 8 is partly diagrammatic sectional view showing certain portions of the modified form of the harvester and illustrating the relative position of the vertically-adjustable running-wheel of the harvester relative to the opposite wheel when the machine is working on an incline or sidehill.
We will first describe that form of our invention illustrated in Figs. 1 to 4, inclusive. The axle 1 of the harvester-wheel 2 is journaled in boxes 3, attached to the under side of a frame 4, consisting of two bars arranged parallel and pivoted at 5 to beam 6, that projects laterally from the side of the harvester. Such frame 4 may be adjusted at its free end higher or lower, as may be required, to adapt the machine to run on inclines or side-hills. In other words, the wheel 2 will be adjusted higher or lower, according as the inclination of the ground is greater or less, and thereby the harvester will be kept practically level or horizontal. When the machine is running on level ground, the pivoted frame 4 will be horizontal, as will be understood by reference to Figs. 1 and 3. For the purpose of adjusting the free end of the wheeled frame 4 any suitable means may be employed, and, as shown in Fig. 2, a rack and pinion subserve this purpose. One of the features of our invention is the provision of a curved guide 7, consisting of a channel-bar curved upon the arc of a circle described from the pivots 5 of the wheeled frame. The said frame has at its free end a projection or guide-pin that slides in the groove of the channel-bar 7. By this means the free end of the wheeled frame is held rigidly against lateral movement and the pivots 5 are correspondingly relieved of undue strain.

Our platform 8 is attached to the outer side bar of the wheeled frame 4, and this attachment is made at the center of the length of the platform and the wheeled frame 4, and therefore at a point directly over the axle 1 of the wheel 2. As shown in Figs. 3 and 8, a stirrup or hook 9 embraces the outer bar of the frame 4 and is provided with a laterally-projecting arm, which constitutes a stub-axle or short journal 10. Instead of the stubjournal 10 the axle 1 may be made longer and be arranged to carry the outer side of the frame. The journal 10 enters a box $10^a$, which is attached to the under side of the platform 8. The latter is thereby adapted to rock on the journal 10 and is also supported thereby at its inner side. It is supported at its outer side by means of two ropes or chains 11, which are suitably attached to the ends of the outer side bar 12 of the platform and pass upward over pulleys, which are journaled in laterally-projecting bars 13, forming a rigid attachment of the side of the harvester. From the pulleys 13 the ropes or chains 11 pass over pulleys which are journaled in frame-pieces 13ᵃ, that project laterally from the opposite side of the harvester, and thence the said ropes or chains pass down and are secured to the opposite wheeled frame 4ᵃ, which is a fixed portion of the main frame. The said ropes are attached to eyebolts, as shown in Figs. 3 and 4, and are taken up or let out, according to the up or down adjustment of the hinged frame on the opposite side of the machine. In practice we propose to pivot and adjust the frame 4ᵃ in the same manner as frame 4.

As indicated in Figs. 1, 3, 4, the platform is provided with a grain-box or hopper $x$, into which the side spout $y$ of the thresher delivers. The filled sacks accumulated upon the rear portion of the platform, as indicated in Fig. 1, will be discharged by means of a tilting device arranged at that point, but which constitutes no part of our invention.

In the form of our invention illustrated in Figs. 5 to 8, inclusive, but a single rope or chain 11ᵃ is employed, the same being connected with a bar 14, forming a side attachment of the platform, through the medium of a cross-piece 15 and diverging rods 16. (See Figs. 5 and 6.) The axle 1ᵃ extends through a boxing 3ᵃ, attached to the under side of said bar 14, and it also passes intermediately through a vertical bar 17. Since the axle 1ᵃ is journaled in boxes forming an attachment of the wheeled frame 4ᵇ, the said bar 17 and the platform or platform-bar 14 will be carried up and down, according as such wheeled frame is adjusted higher or lower at its free end. In Fig. 5 the wheeled frame 4ᵇ is adjusted as low as practicable, and in Fig. 6 it is adjusted as high as practicable, the adjustment being made according to the inclination of the surfaces on which the machine is operating. The aforesaid vertical bar 17 is supported by braces 18, which are arranged in triangular relation to it and attached at their converging ends to the platform-bar 14. The vertical bar 17 is further braced by the rod 19, which extends on the opposite side to the left-hand end of the platform-bar 14. That end of the latter rests against a vertical bar 20 and is adapted to slide up and down in contact therewith. Such bar 20 is attached to a horizontal bar 21, which is held and adapted to slide in stirrups or keepers 22, that form an attachment of the front portion of the harvester-frame. Such slidable bar 21 and the vertical bar 20 are further rigidly connected by means of an inclined brace 23. In both Figs. 5 and 6 the ends of the vertical bar 20 are shown connected with the vertical bar 17 by means of bars 24. As shown in Fig. 5, when the wheeled frame 4ᵇ is adjusted downward at or near its lowest limit the bar 17 and its braces 18 and the platform 14 are all carried down with it; but the vertical bar 20 and sliding bar 21 remain in fixed relation to the harvester-frame so far as relates to vertical movement; but in passing from the lower to the higher position, or vice versa, the bar 21 slides in its keepers and the bar 20 necessarily slides with it. In brief, the platform 14 is held practically at the same distance above the ground whatever be the inclination of the latter, and it is held also horizontal whatever be its adjustment vertically and whatever be the inclination of the pivoted wheeled frame 4ᵇ.

It is apparent that the tension of the rope or chain 11ᵃ is applied equally to the ends of the platform 14 through the medium of the diverging rods 16 and that the platform is further held horizontal through the medium of the peculiar arrangement of fixed and movable braces, &c.

In Fig. 7, 25 indicates a tilting platform pivoted to the platform proper, 14, and adapted to be tilted for discharging filled sacks.

It will be seen that by means of our invention in either form we provide a platform upon which harvest hands may stand and upon which sacks of grain may be carried and from which they may be discharged and deposited on the ground at intervals, also that the whole weight of the platform attachment is supported upon the drive-wheels and that the thresher is mainly relieved of extra weight upon one side, so that it may be more easily kept in vertical position.

What we claim is—

1. The combination with a combined harvester of a platform which is pivotally connected with the wheeled frame on the side thereof, and means for adjusting the platform higher or lower, substantially as described.

2. The combination with a combined harvester, of a side platform and means for pivotally connecting it with the wheeled frame of said harvester, and means for supporting the outer side of the platform, substantially as described.

3. The combination with the combined harvester of a side platform for the purpose specified, a central pivoted support attached to the wheeled frame of the harvester, and means for supporting the platform and adjusting it higher or lower, substantially as described.

4. The combination with the combined harvester having a pivoted wheeled frame adapted to swing in a vertical plane, of a platform attachment which is connected with said wheeled frame and thus adapted to be carried up or down with it, and means for holding the platform in different vertical adjustments, substantially as described.

5. The combination, with the combined harvester, and a pivoted wheeled frame, of a platform attachment connected with such wheeled frame, and a rope or chain attached to the outer side of the platform and passing over guides provided in laterally-extended frames, and attached to the opposite side of the harvester, substantially as described.

6. The combination, with a combined harvester and a wheeled frame pivoted on the side thereof, of a platform attachment comprising a platform proper, means for attaching it centrally to said wheeled frame, the platform being adapted to rock or oscillate in a vertical plane, a rope supporting the outer edge of the platform, a fixed triangular frame connected with the platform and the pivot-support of the same, and an adjustable frame pivotally connected with the fixed frame and adapted for automatic adjustment as the wheeled frame is raised or lowered, substantially as described.

7. The combination, with the harvester and its pivoted wheeled frame, of the platform and a device attached to the outer bar of said wheeled frame and provided with a journal upon which the platform is supported and adapted to oscillate in a vertical plane, a rigid frame connected with the platform, and a movable frame on the opposite side of the fixed frame, the same being composed of pivoted bars connected with the fixed frame and a sliding bar which is adjusted corresponding to the adjustment of the wheeled frame, substantially as described.

8. The combination, with the thresher and the wheeled frame pivoted on the side thereof, of the platform attachment which is pivotally connected with such wheeled frame, a vertical bar 17 which is rigidly connected with the platform, parallel bars 24 pivoted to the ends of the said vertical bar and to another vertical bar 20, the said bar 20 and a bar 21 adapted to slide in fixed supports to which said bar 20 is rigidly attached, substantially as described.

9. The combination, with the harvester and the wheeled frame pivoted on the side thereof, of means for adjusting said frame higher or lower at its free end and a curved guide arranged adjacent thereto and operatively connected with the latter so that the frame is held against lateral movement as described.

10. The combination with the harvester and a wheeled frame pivoted on the side thereof and having a curved channel guide-bar arranged in a vertical plane opposite the free end of said frame which is provided with a pin adapted to slide in the channel of the guide-bar substantially as described.

FRANK McCOWN.
    ALVIN G. LOUNDAGIN.
    WILTON A. WILLIAMS.

Witnesses:
 FRED SMITH,
 J. E. HOUTCHENS.